Figures 1, 2:
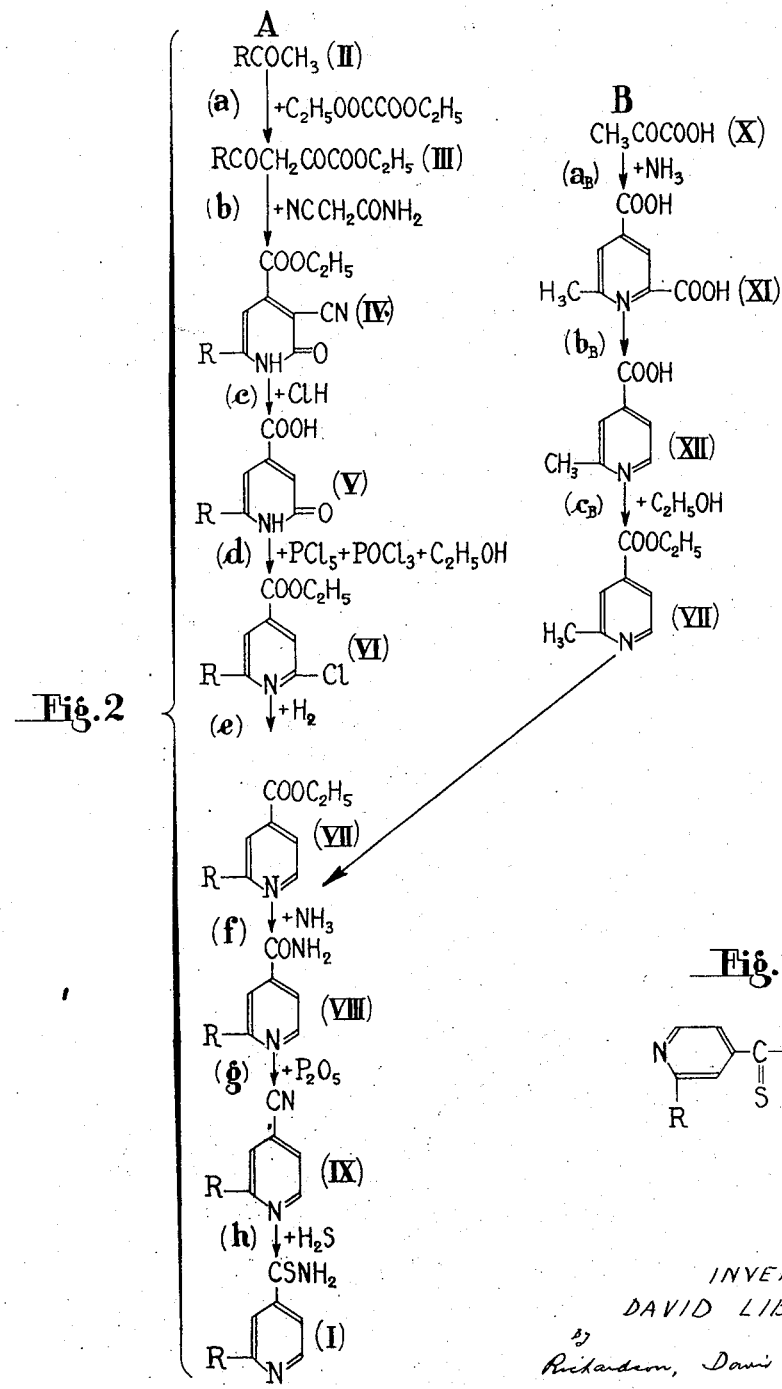

Aug. 25, 1959  D. LIBERMAN  2,901,488

CERTAIN 2-SUBSTITUTED ISONICOTINIC THIOAMIDES

Filed March 25, 1957

INVENTOR:
DAVID LIBERMAN

United States Patent Office 2,901,488
Patented Aug. 25, 1959

2,901,488

CERTAIN 2-SUBSTITUTED ISONICOTINIC THIOAMIDES

David Liberman, Paris, France, assignor to Chimie et Atomistique, Paris, France, a corporation of France Application March 25, 1957, Serial No. 648,107

Claims priority, application France March 27, 1956

9 Claims. (Cl. 260—294.8)

An object of the present invention is to provide new thioamides of the pyridinic series, namely: α-substituted isonicotinic thioamides.

These new compounds (I) satisfy the formula shown in Fig. 1 of the accompanying drawing in which R is an alkyl, aryl or aralkyl radical. As examples of the compounds coming within the scope of the present invention, there may be mentioned:

α-methyl-isonicotinic thioamide ($R=CH_3$)
α-ethyl-isonicotinic thioamide ($R=C_2H_5$)
α-(N) propyl-isonicotinic thioamide
  ($R=CH_2$—$CH_2$—$CH_3$)
α-isobutyl-isonicotinic thioamide
  ($R=CH_2$—$CH$—$(CH_3)_2$)
α-amyl-isonicotinic thioamide ($R=CH_2$—$(CH_2)_3$—$CH_3$)
α-benzyl-isonicotinic thioamide ($R=CH_2$—$C_6H_5$)
α-isopropyl-isonicotinic thioamide ($R=CH$—$(CH_3)_2$)
α-n-butyl-isonicotinic thioamide ($R=CH_2(CH_2)_2CH_3$)
α-n-hexyl-isonicotinic thioamide ($R=CH_2(CH_2)_4CH_3$)
α-phenyl-isonicotinic thioamide ($R=C_6H_5$)

The compounds embodying the invention have interesting bactericidal properties which permit their use in food industries and in the manufacture of detergents. They furthermore possess marked therapeutic properties in respect of tuberculosis and leprosy.

Another object of the invention is to provide a process of preparing these new compounds. This process is characterized in that it comprises reacting hydrogen sulphide on the nitrile of the corresponding α-substituted isonicotinic acid. This reaction is conveniently carried out by bubbling hydrogen sulphide in a solution of nitrile in an anhydrous solvent, such as ethanol, in the presence of a nitrogenous tertiary base, such as triethanolamine. The thioamide crystallizes in the reaction mixture, whence it is separated by draining.

The nitrile of α-substituted isonicotinic acid can be obtained from an ester of the corresponding α-substituted isonicotinic acid which is converted in an intermediate stage into the corresponding amide.

The preparation of α-substituted isonicotinic thioamide (I) from an ester of the corresponding α-substituted isonicotinic acid (VII) is illustrated by the stages $f$, $g$, $h$ shown in Fig. 2 of the accompanying drawing, which diagrammatically represents the operations permitting the thioamides of the invention to be obtained from readily available simple compounds.

At stage $f$, the ester (VII), which is shown in the form of ethyl ester although other esters could be used in similar manner, is treated with concentrated ammonia by which it is converted into the corresponding amide (VIII). The treatment could be carried out by agitating the ester (VII) at low temperature with a concentrated solution of ammonia in a solvent, such as ethyl alcohol.

At stage $g$, the amide (VIII) is converted into nitrile (IX) by heating between 160 and 180° C. in a vacuum with phosphoric anhydride acting as a dehydrating agent.

It is possible to obtain a more complete synthesis of the desired α-substituted thioamides by preparing the ester (VII) from simpler compounds. Two procedures are available for this purpose:

Procedure A which is generally applicable irrespective of the type of radical R.

Procedure B applicable solely when the radical $R=CH_3$.

These two procedures are generally illustrated by the columns marked A and B in Fig. 2.

Procedure A will first be described, in which the stages (a) to (e) are necessary to obtain the ester VII.

In the stage (a), the ketone R—CO—CH_3 (II) is condensed with an oxalic acid ester, such as ethyl oxalate, $C_2H_5OCOCOOC_2H_5$ in the presence of an alkali metal alcoholate. In this may the corresponding ethyl R-acyl-pyruvate (III) is obtained.

In stage (b), the compound (III) is condensed with cyanacetamide, $NCCH_2CONH_2$, in the presence of a nitrogeneous base, such as piperidine, to obtain 3-cyano-4-carbethoxy-2-pyridone substituted at position 6 by the radical R (IV).

In stage (c), the compound IV is treated with hot-concentrated hydrochloric acid, which eliminates the cyano group at position 3 and saponifies the ester group at position 4. 2-pyridone-4 carboxylic acid, substituted at position 6 by the radical R (V), is thus obtained.

In stage (d), the compound V, which acts in the tautomer form of the corresponding 2-hydroxy pyridine.

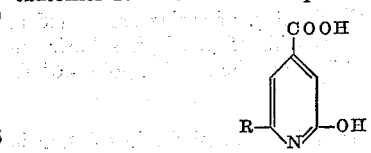

transforms into 2-chloro-isonicotinic acid chloride substituted at position 6 by the radical R

The chlorination is carried out by a mixture of phosphorus oxychloride and phosphorus pentachloride. After distillation of the phosphorus oxychloride the residue is extracted by ethyl alcohol, which determines the conversion of the acid chloride into the corresponding ester (VI).

In stage (e) the compound (VI) is hydrogenated catalytically so as to obtain its dechlorination. This results in the compound (VII). The series of reactions (stages $f$, $g$, $h$) previously described for obtaining the compounds of the invention started with this compound (VII).

The procedure B, permitting the compound (VII) to be obtained when R is $CH_3$, will now be described. This procedure comprises three stages $a_B$, $b_B$, $c_B$.

In stage $a_B$, pyruvic acid (X), $CH_3COCOOH$ is taken and three molecules thereof are condensed with ammonia in an alcohol medium into uvitonic acid (XI).

In stage $b_B$, the uvitonic acid is decarboxylated by careful heating around 300° C. into α-methyl-isonicotinic acid (XII).

In stage $c_B$, the α-methyl-isonicotinic acid is esterified, for example by ethyl alcohol, into ethyl α-methyl-isonicotinate which is the compound (VII) with $R=CH_3$.

Some examples will now be given of the preparation of the compounds of the invention in accordance with the above-defined process.

EXAMPLE 1.—α-METHYL ISONICOTINIC THIOAMIDE (COMPOUND I, R=CH₃)

This compound is prepared according to the procedure B.

Stage $a_B$—uvitonic acid (XI)

75 g. of pyruvic acid are added drop by drop to 750 cc. of absolute alcohol saturated with ammonia at 0° C. Uvitonic acid precipitates out. 16 g. of the latter are obtained, the acid having a melting point higher than 330° C.

Stage $b_B$—α-methyl-isonicotinic acid (XII)

5 g. portions of uvitonic acid are heated at 280° C. under atmospheric pressure so as to bring about decarboxylation; the crude product is recrystallized in water and has a melting point of 292° C. 34 g. of uvitonic acid gives 10 g. of α-methyl-isonicotinic acid.

Stage $c_B$—ethyl α-methyl-isonicotinate (VII)

The above-mentioned 10 g. of acid are added to 50 cc. of absolute ethyl alcohol and 10 g. of concentrated sulphuric acid. The mixture is refluxed for 3 hours and 7.5 g. of the desired ester, having a boiling point of 102–104° C./9 mm., are obtained.

Stage f—α-methyl-isonicotinic amide (VIII—R=CH₃)

14 g. of the ester prepared as explained above is agitated mechanically with 15 cc. of alcohol saturated with ammonia at 0° C. The yield in amide is 9.5 g. and the melting point thereof is 163° C.

Stage g—α-methyl-isonicotinic nitrile (IX—R=CH₃)

The previously obtained 9.5 g. of amide are heated at 160–180° C. in a vacuum with 15 g. of phosphoric anhydride. The yield is 4.8 g. and the melting point 46° C.

Stage h—α-methyl-isonicotinic thioamide (I—R=CH₃)

The previously obtained 4.8 g. of nitrile in solution in 18 cc. of absolute alcohol containing 1.6 g. of triethanolamine are treated with hydrogen sulphide. 5.1 g. of the desired thioamide are obtained, the melting point being 190° C. (dec.).

EXAMPLE 2.—α-ETHYL-ISONICOTINIC THIOAMIDE (I—R=C₂H₅)

In this and the ensuing examples the procedure A is necessarily adopted the stages of which are indicated merely by the product they provide, it being understood that throughout each example the radical R has the signification indicated in the beginning of each example.

ETHYL PROPIONYL-PYRUVATE (III)

36 g. of methyl-ethyl-ketone and 73 g. of ethyl oxalate are condensed in the presence of sodium ethylate, the reaction being refluxed in an alcohol medium. 28 g. of the desired product, having a boiling point of 100–105° C./6 mm., are obtained.

3-CYANO-4-CARBETHOXY-6 ETHYL—2 PYRIDONE (IV)

205 cc. of alcohol at 60°, 22 g. of the product just obtained, 11 g. of cyanacetamide and 4.5 cc. of piperidine are refluxed. 19 g. of product, having a melting point of 211° C., are obtained.

4-CARBOXY-6 ETHYL- 2 PYRIDONE (V)

30 g. of the cyanopyridone just obtained are refluxed with concentrated hydrochloric acid. 13.5 g. of product, having a melting point of 308° C., are obtained.

2-CHLORO-4-CARBETHOXY- 6 ETHYL-PYRIDINE (VI)

26 g. of the product just obtained are treated with 81 g. of phosphorus pentachloride in 45 cc. of phosphorus oxychloride. The phosphorus oxychloride is distilled off in a vacuum and the residue is treated with absolute alcohol. After distillation there are obtained 24 g. of product having a boiling point of 127–131° C./8 mm.

ETHYL-2-ETHYL-ISONICOTINATE (VII)

10 g. of the ester just obtained dissolved in 80 cc. of absolute alcohol containing 5.5 g. of potassium acetate are hydrogenated catalytically on 5% palladium black. 8 g. of product, having a boiling point of 120–124° C./14 mm., are obtained.

2-ETHYL-ISONICOTINIC-AMIDE (VIII)

20 g. of the ester just obtained are agitated with 25 cc. of concentrated ammonia. 11 g. of product having a melting point of 131° C., are obtained.

2-ETHYL-ISONICOTINIC NITRILE (IX)

The 11 g. of the amide just obtained are treated with 15 g. of phosphorus anhydride at 160–180° C. in a vacuum. 6 g. of a non-distilled liquid are obtained.

α-ETHYL-ISONICOTINIC THIOAMIDE (I)

The 6 g. of the liquid just obtained, in solution in 15 cc. of absolute alcohol containing 2 g. of triethanolamine, are treated with hydrogen sulphide. 6.5 g. of the desired product, having a melting point of 166° C., are obtained.

EXAMPLE 3.—α-(N)-PROPYL-ISONCOTINIC THIOAMIDE (I—R=CH₂CH₂CH₃)

ETHYL BUTYRYL-PYRUVATE (III)

146 g. of ethyl oxalate are condensed with 86 g. of methyl-(n)-propyl-ketone in the presence of sodium ethylate prepared from 25 g. of sodium. 135 g. of product, having a boiling point of 113° C./6 mm., are obtained.

3-CYANO-4-CARBETHOXY-6-(N)-PROPYL-2-PYRIDONE (IV)

The 135 g. of the product just obtained are condensed with 62 g. of cyanacetamide in the presence of 24 cc. of piperidine in 1200 cc. of alcohol at 95°. 64 g. of a product, melting at 152° C., are obtained.

6-N-PROPYL-2 PYRIDONE-4-CARBOXYLIC ACID (V)

The 64 g. of the product just obtained are treated with 500 cc. of concentrated hydrochloric acid at boiling point. 40 g. of a product, having a melting point of 285° C., are obtained.

ETHYL 2-CHLORO-6-(N)-PROPYL-ISONICOTINATE (VI)

The 40 g. of the acid just obtained are treated with 80 g. of phosphorus oxychloride and 95 g. of phosphorus pentachloride. The phosphorus oxychloride is distilled and the reaction mixture is treated with 400 g. of absolute alcohol. 40 g. of chlorinated ester (VI), having a boiling point of 115–116° C./2 mm., are obtained.

ETHYL 2-(N)-PROPYL-ISONICOTINATE (VII)

The product just obtained is dechlorinated by catalytically hydrogenating it in an alcohol medium in the presence of palladium black and potassium acetate. 30 g. of the ester (VII), having a boiling point of 121–125° C./7 mm., are obtained.

2-(N)-PROPYL-ISONICOTINAMIDE (VIII)

The 30 g. of the ester just obtained are treated with 40 cc. of concentrated ammonia saturated with gaseous ammonia. 20 g. of product, having a melting point of 135° C., are obtained.

2-(N) PROPYL-ISONICOTINIC-NITRILE (IX)

The 20 g. of the amide just obtained are treated with 32 g. of phosphoric anhydride. 11 g. of nitrile, having a boiling point of 90–95° C./4 mm., are obtained.

α-(N)-PROPYL-ISONICOTINIC THIOAMIDE

The 11 g. of nitrile just obtained, dissolved in 40 cc. of ethanol containing 4 g. of triethanolamine, are treated with hydrogen sulphide. 8 g. of the desired product, having a melting point of 142° C., are obtained.

EXAMPLE 4.—α-ISOBUTYL-ISONICOTINIC THIOAMIDE (I—R=CH₂—CH—(CH₃)₂)

ETHYL ISOVALERYL-PYRUVATE (III)

The following mixture is refluxed:

100 g. methylisobutylketone
146 g. ethyl oxalate
25 g. sodium
250 g. absolute alcohol (the sodium being previously dissolved in the alcohol).

Yield of compound (III): 171 g.—boiling point: 106–109° C./4 mm.

3-cyano-4-carbethoxy-6-isobutyl-2-pyridone (IV).

The following mixture is refluxed:
93 g. of the preceding ester
39 g. of cyanacetamide
15 cc. of piperidine
750 cc. of absolute alcohol.
Yield:
55 g.—Melting point: 156° C.

4-carboxy-6-isobutyl-2-pyridone (V).

The 55 g. of the product just obtained are hydrolyzed with 450 cc. of concentrated hydrochloric acid. Yield: 36 g.—Melting point 270° C.

2-CHLORO-4-CARBETHOXY-6-ISOBUTYL-PYRIDINE (VI)

The 36 g. of the product just obtained are treated with 96 g. of P Cl₅ in 71 g. of P O Cl₃. The chloride of the chlorinated acid is thereafter treated with absolute alcohol. Yield: 37 g.—Boiling point: 146–150° C./8 mm.

ETHYL 2-ISOBUTYL-ISONICOTINATE (VII)

24 g. of the ester just obtained are dechlorinated by catalytic hydrogenation as in the previous examples. Yield: 16 g.—Boiling point: 110–114° C./3 mm.

ISOBUTYL-2-ISONICOTINIC AMIDE (VIII)

The 16 g. of the product just obtained are agitated with 15 cc. of concentrated ammonia. Yield: 7 g.—Melting point: 106° C.

2-ISOBUTYL-2-ISONICOTINIC NITRILE (IX)

The 7 g. of the product just obtained are treated with 12 g. of P₂O₅. Yield: 5 g.—Boiling point: 107–117° C./6 mm.

α-ISOBUTYL-ISONICOTINIC THIOAMIDE (I)

The 5 g. of the product just obtained are dissolved in 15 cc. of absolute alcohol to which are added 1.5 g. of triethanolamine. A current of hydrogen sulphide is passed through the solution. Yield of the first crop: 1.8 g.—Melting point: 153° C.

EXAMPLE 5.—α-AMYL-ISONICOTINIC THIOAMIDE.
(I—R=CH₂—(CH₂)₃—CH₃)

ETHYL CAPROYLPYRUVATE (III)

63 g. of methyl-amyl-ketone and 81 g. of ethyl oxalate are condensed in the presence of sodium ethylate prepared from 13.8 g. of sodium and 150 cc. of absolute alcohol, 400 cc. of alcohol being added to the reaction mixture so as to render it fluid. After acidification with sulphuric acid, 88 g. of product, having a boiling point of 130° under 4.5 mm., are obtained.

3-CYANO-4-CARBETHOXY-6-AMYL-2-PYRIDONE

The 88 g. of the product just obtained are condensed with 34.5 g. of cyanacetamide in the presence of 13.2 cc. of piperidine in 660 cc. of alcohol at 95° C. 42 g. of a product, having a melting point of 117° C., are obtained.

6-AMYL-2-PYRIDONE-4-CARBOXYLIC ACID (V)

The 42 g. of the product just obtained are hydrolyzed by refluxing them with 300 cc. of concentrated hydrochloric acid. 30 g. of a product, having a melting point of 232° C., are obtained.

ETHYL 2-CHLORO-6-AMYL-ISONICOTINATE (VI)

The 30 g. of the acid just obtained are treated with 57 g. phosphorus oxychloride and 78 g. phosphorus pentachloride. The phosphorus oxychloride is distilled off and the reaction mixture is treated with 70 g. of absolute alcohol. 21 g. of chlorinated ester, having a boiling point of 150–160° C./2 mm., are obtained.

ETHYL 2-AMYL-ISONICOTINATE (VII)

The 21 g. of product just obtained are hydrogenated in 150 cc. of absolute alcohol containing 9 g. of potassium acetate in the presence of 5% palladium black. 12 g. of product having a boiling point of 165–169° C./6 mm., are obtained.

2-AMYL-ISONICOTINAMIDE (VIII)

The 12 g. of the product just obtained are agitated with 10 g. of concentrated ammonia saturated with gaseous ammonia at 0° C. It was found impossible to obtain the amide without heating. To obtain it, the reaction mixture is heated in a sealed tube at 110° C. for 6 hours. The oily layer obtained sets into a solid mass upon trituration with petroleum ether. 5 g. of amide, having a melting point of 89° C., are obtained.

2-ISONICOTINIC NITRILE (IX)

The 5 g. of amide just obtained are dehydrated with 8 g. of phosphorus anhydride at 160° C. 2 g. of a liquid product which does not set into a solid mass in an ice box, are obtained.

α-AMYL-ISONICOTINATE THIOAMIDE (I)

The 2 g. of nitrile just obtained, dissolved in 10 cc. of absolute alcohol, to which is added 0.6 g. of triethanolamine, are treated with hydrogen sulphide in ice. Nothing crystallizes. The reaction mixture is treated with water, the insoluble product is separated and dissolved in benzene. The latter is thereafter distilled off and the residue is triturated on a porous plate. The desired product, which has a melting point of 70° C., is obtained.

EXAMPLE 6.—α-BENZYL-ISONICOTINIC THIOAMIDE (I—R=CH₂—C₆H₅)

ETHYL PHENYLACETYLPYRUVATE (III)

A solution of 25 g. of sodium in 300 cc. of absolute alcohol is treated with a mixture of 134 g. of benzyl-methyl-ketone and 146 g. of ethyl oxalate at 10° C. The mixture is thereafter acidified by 25% sulphuric acid, poured onto ice and extracted with 500 cc. of benzene. The mixture is dried and the benzene distilled off in a vacuum. 224 g. of a thick red oil are obtained.

3-CYANO-4-CARBETHOXY-6-BENZYL-2-PYRIDONE (IV)

A suspension of sodium cyanacetamide in alcohol was prepared by putting 65 g. of cyanacetamide in a solution of 18.6 g. of sodium in 235 cc. of methyl alcohol. The cyanacetamide was previously dissolved in 400 cc. of absolute ethyl alcohol. The previously obtained oil is thereafter added drop by drop while cooling. The mixture is agitated for 4 hours and the alcohol is distilled off in a vacuum. The residue is dissolved in the minimum of water and slowly acidified with ClH to pH 2. The resin obtained is malaxed several times with water, extracted with 350 cc. of alcohol and filtered 71 g. of pyridine (M.P.=167–168° C.), are thus obtained.

2-PYRIDONE-6-BENZYL-4-CARBOXYLIC ACID (V)

The 71 g. of the product just obtained are gently refluxed for 6 hours with 285 cc. of 50% SO₄H₂. The mixture is filtered and the filtrate is poured on 1 kg. of ice and water while agitating. 47 g. of a product, having a melting point of 320–325° C., are obtained.

ETHYL 2-CHLORO-6-BENZYL ISONICOTINATE (VI)

The 47 g. of the product just obtained are dissolved in 76 g. of phosphorus oxychloride while refluxing at 105–110° C. 104 g. of phosphorus pentachloride are thereafter added in small amounts during 45 minutes while always maintaining the temperature at 105–110° C. The phosphorus oxychloride is thereafter distilled off in a vacuum, the residue is cooled in a mixture of ice and salt and 120 cc. of absolute alcohol are added slowly while agitating. Everything dissolves and the whole is then poured on 270 g. of crushed ice. The mixture is washed with water and extracted with ether. The ether solution is washed with a solution of sodium bicarbonate, dried on SO₄Na₂ and filtered. The ether is distilled off and the residue is distilled in a vacuum. 31 g. of a product, which distills at 185–189° C./9 mm. and solidifies upon cooling, are obtained.

ETHYL 2-BENZYL-ISONICOTINATE (VII)

The chlorinated derivative is reduced catalytically in the presence of 5% palladium black. 11 g. of potassium acetate are added to the 31 g. of the chlorinated derivative in 350 cc. of alcohol. The catalyst is introduced in two goes. 0.5 g. of palladium chloride are used in all. The reduction is terminated when 2450 cc. of hydrogen have been absorbed. The catalyst is drained and the alcohol is distilled off in a water bath. The product crystallizes. It is extracted with 100 cc. of ether, washed with a solution of bicarbonate and then with water. The product is dried on SO₄Na₂ and distilled. 19 g. of product, having a boiling point of 187–190° C./4 mm., are obtained.

2-BENZYL-ISONICOTINAMIDE (VIII)

The 19 g. of the ethyl 2-benzyl isonicotinate just obtained are put into 50 cc. of ammonia at 28° Bé. which had been previously saturated with a current of gaseous NH₃ at 0° C. The mixture is agitated for 2 hours on a shaking machine and left over night in an ice box. The precipitated amide is drained and the filtrate is again saturated with HN₃. After several treatments, 14 g. of a white product, having a melting point of 153–158° C., are obtained.

2-BENZYL-ISONICOTINONITRILE (IX)

The 14 g. of the product just obtained are heated with 20 g. of phosphoric anhydride in a vacuum at 160–170° C. for 5 hours. The mixture is allowed to cool, ice is added, and the mixture is alcalinized with sodium hydroxide. The product is extracted with 150 cc. of ether and then twice with 50 cc. of ether. The ethereal extracts are dried on calcium chloride, the ether is distilled off and the nitrile is distilled in a vacuum. 8 g. of product, having a boiling point of 175–180° C./6 mm., are obtained.

α-BENZYL-ISONICOTINIC THIOAMIDE (I)

The 8 g. of 2-benzyl-isonicotinonitrile just obtained are dissolved in 25 cc. of absolute alcohol to which are added 2.7 g. of triethanolamine. A current of dry hydrogen sulphide is passed therethrough; when after 30 minutes a temperature of 25° C. is obtained, the flask is plunged into ice water and the H₂S is continued to be passed therethrough for a further hour. The thioamide crystallizes little by little and finally everything sets into a solid mass. The product is filtered, washed with very little cold alcohol and dried 10 minutes at 70° C. 6 g. of product in the form of a mimosa yellow crystalline powder and having a melting point of 150° C., are obtained.

EXAMPLE 7.—α-ISOPROPYL-ISONICOTINIC THIOAMIDE.
(I—R=CH—(CH₃)₂)

ETHYL ISOBUTYRYLPYRUVATE (III)

25 g. of sodium are dissolved in 250 g. of absolute alcohol. 86 g. of methyl-isopropylketone and 146 g. of ethyl oxalate are added. In the course of the operation a further 100 cc. of alcohol are added so as to render the mixture fluid. The mixture is then treated with dilute sulphuric acid and extracted with benzene. 15.3 of product, having a boiling point of 113–116° C./5 mm., are obtained.

3-CYANO-4-CARBETHOXY-6-ISOPROPYL-2-PYRIDONE (IV)

360 g. of the product just obtained are treated with 138 g. of cyanacetamide and 52 cc. of piperidine in 2 litres of alcohol. 221 g. of pyridone, having a melting point of 197° C., are obtained.

2-PYRIDONE-6-ISOPROPYL-4-CARBOXYLIC ACID (V)

100 g. of the product just obtained are refluxed for 4 hours with 150 cc. of sulphuric acid and 225 cc. of water. Everything dissolves easily. The solution is poured into 1 litre of water. 51 g. of a product, having a melting point of 340° C., are obtained.

ETHYL 2-CHLORO-6-ISOPROPYL-ISONICOTINATE (VI)

86 g. of the product just obtained are treated with 200 g. of POCl₃ and 207 g. of PCl₅, then, after departure of POCl₃, with 240 g. of absolute alcohol. The mixture is poured onto 700 g. of ice and extracted with ether. 52 g. of product, having a boiling point of 142–148° C./7 mm., are obtained.

ETHYL 2-ISOPROPYL-ISONICOTINATE (VII)

52 g. of the ester just obtained and 24 g. of potassium acetate are dissolved in 250 cc. of absolute alcohol. The product is hydrogenated in the presence of palladium black. In all, 5200 cc. of hydrogen are absorbed. The usual treatment yields 35 g. of product having a boiling point of 118–122° C./6 mm.

2-ISOPROPYL-ISONICOTINAMIDE (VIII)

30 g. of ester are heated with 90 cc. of alcohol saturated with NH₃ in a sealed tube for 24 hours. 12.5 g. of a pasty amide are obtained by trituration with petroleum ether.

2-ISOPROPYL-ISONICOTINONITRILE (IX)

By heating 12.5 g. of amide and 20 g. of P₂O₅, 8 g. of oily nitrile are obtained.

α-ISOPROPYL-ISONICOTINIC THIOAMIDE (I)

8 g. of nitrile, 24 cc. of absolute alcohol and 2.7 g. of triethanolamine are saturated with H₂S. 1.8 g. of thioamide, having a melting point of 132° C., are obtained.

EXAMPLE 8.—α-N-BUTYL-ISONICOTINIC THIOAMIDE.
(I—R=CH₂(CH₂)₂CH₃)

ETHYL VALERYLPYRUVATE (III)

A mixture of 143 g. of methyl-n-butylketone and 209 g. of ethyl oxalate is poured into the alcoholate obtained from 36 g. of Na and 500 g. of absolute alcohol. After treating with diluted SO₄H₂ and extraction with benzene, only 53 g. of the product, having a boiling point of 150–152° C./22 mm., are obtained.

3-CYANO-4-CARBETHOXY-6-N-BUTYL-2-PYRIDONE (IV)

100 g. of ethyl valerylpyruvate, 42 g. of cyanacetamide and 600 cc. of alcohol are heated to 60° C. and treated with 16 cc. of piperidine while agitating. The mixture is continued to be heated for a further day, the alcohol is distilled off and the product is extracted with water. 60 g. of product, having a melting point of 114° C., are obtained.

2-PYRIDONE-6-N-BUTYL-4-CARBOXYLIC ACID (V)

The 60 g. of the product just obtained are refluxed for 5 hours with 90 cc. of SO₄H₂ and 135 g. of water. The mixture is poured onto ice, filtered, washed and dried. The yield is 38 g. (M.P.=225°C.).

ETHYL 2-CHLORO-6-N-BUTYL-ISONICOTINATE (VI)

The 39 g. of the product just obtained are treated with 72 g. of POCl₃ and 100 g. of PCl₅ under the usual conditions. After departure of POCl₃ the mixture is treated with 90 g. of absolute alcohol. After extracting with ether and distillation, 30 g. of product, having a boiling point of 148° C./5 mm., are obtained.

ETHYL 2-N-BUTYL ISONICOTINATE (VII)

The 30 g. of the product just obtained are dissolved in 250 cc. of absolute alcohol with 14 g. of potassium acetate. The product is hydrogenated in the presence of palladium black. 16.5 g. of product, having a boiling point of 124–130° C./4 mm., are obtained.

2-N-BUTYL-ISONICOTINAMIDE (VIII)

The 16.6 g. of the product just obtained are treated with 15 cc. of saturated ammonia and the amide is slowly formed. 8.5 g. of product, having a melting point of 122° C., are obtained.

2-N-BUTYL-ISONICOTINONITRILE (IX)

The 8.5 g. of the product just obtained are heated with 14 g. of $P_2O_5$. 5.5 g. of nitrile, having a boiling point of 102–112° C./8 mm., are obtained.

α-N-BUTYL-ISONICOTINIC THIOAMIDE (I)

The 5.5 g. of the product just obtained, dissolved in 15 cc. of absolute alcohol with 2 g. of triethanolamine, are transformed into thioamide by a current of hydrogen sulphide. 2.9 g. of thioamide, having a melting point of 135° C., are obtained.

EXAMPLE 9.—α-N-HEXYL-ISONICOTINIC THIOAMIDE (I—R=CH$_2$—(CH$_2$)$_4$CH$_3$)

ETHYL OENANTHYL-PYRUVATE (III)

25 g. of sodium are dissolved in 300 g. of absolute alcohol. A mixture of 128 g. of methyl-n-hexyl-ketone and 146 g. of ethyl oxalate are added while cooling and the mixture is acidified with dilute $SO_4H_2$. The product is extracted with benzene, dried and the solvent distilled off. 220 g. of an oil are obtained; this oil is used without distilling.

3-CYANO-5-CARBETHOXY-6-N-HEXYL-2-PYRIDONE (IV)

22.5 g. of sodium are dissolved in 275 cc. of methyl alcohol. There is added, while agitating, a solution of 76 g. of cyanacetamide in 410 cc. of absolute ethyl alcohol. 220 g. of ethyl oenanthyl-pyruvate are added during 2 hours while cooling. The mixture is agitated for 4 hours at room temperature. The mixture is distilled on a water bath and in the end distilled in a vacuum. The residue is dissolved in 500 cc. of water, discoloured with carbon black and filtered. The filtrate is acidified with hydrochloric acid to pH 2. The resin formed is washed with water and then put into suspension in 300 cc. of alcohol. The product is filtered, washed with very little alcohol and dried. 50 g. of yellow crystalline powder, having a melting point of 120° C., are obtained.

2-PYRIDONE-6-N-HEXYL-4-CARBOXYLIC ACID (V)

50 g. of the product just obtained are gently refluxed for 7 hours with 200 cc. of 50% $SO_4H_2$. The cooled liquid is poured onto 1.5 kg. of ice to which water is added. 44 g. of beige powder, having a melting point of 226–228° C., are obtained.

ETHYL 2-CHLORO-6-N-HEXYL-ISONICOTINATE (VI)

50 g. of the product just obtained are dissolved in 85 g. of POCl$_3$ by refluxing. 116 g. of PCl$_5$ are then added in small amounts and then the mixture is heated for one hour at 140° C. The excess POCl$_3$ is distilled off in a vacuum. The residue is cooled to 0° C. and 100 cc. of absolute alcohol are slowly added. Everything dissolves and the mixture is left overnight. The liquid is poured onto 350 g. of crushed ice and the mixture is extracted with ether. The ethereal extracts are washed with water, then dried and filtered. The ether is distilled off and the product distilled in a vacuum. 38 g. of product, having a boiling point of 185–188° C./5 mm., are obtained.

ETHYL 2-N-HEXYL-ISONICOTINATE (VII)

38 g. of the product just obtained are dissolved in 300 cc. of absolute alcohol. 15 g. of potassium acetate are added and the product is hydrogenated in the presence of palladium black. 3160 cc. of hydrogen are absorbed. The mixture is drained and distilled. 27 g. of colourless liquid which distills at 162–166° C./6 mm. are obtained.

2-N-HEXYL-ISONICOTINAMIDE (VIII)

27 g. of the product just obtained are put into 70 cc. of ammonia at 20° Bé.; the mixture is saturated, while being maintained at 0°, with a current of gaseous ammonia for 1 hour. The mixture is agitated and put into an ice box, drained and dried. 17.5 g. of product, having a melting point of 106–108° C., are obtained.

2-N-HEXYL-ISONICOTINONITRILE (IX)

17.5 g. of the product just obtained are rapidly mixed with 25 g. of $P_2O_5$. The mixture is heated for 5 hours at 160–170° C. in a vacuum of 20–30 mm. of mercury. Crushed ice and concentrated soda lye are added until pH 10 is reached. The suspension obtained is extracted several times with ether. After distillation in a vacuum, 10 g. of nitrile, having a boiling point of 145–150° C./6 mm., are obtained.

α-N-HEXYL-ISONICOTINIC THIOAMIDE (I)

The 10 g. of nitrile just obtained are dissolved in 15 cc. of absolute alcohol; the solution is saturated for 2 hours with dry hydrogen sulphide while cold. The mixture sets into a solid mass, it is filtered, washed with very little alcohol and dried at 60° C. 7 g. of crystalline powder having a melting point of 124–125° C., are obtained.

EXAMPLE 10.—α-PHENYLISONICOTINIC THIOAMIDE (I—R=C$_6$H$_5$)

ETHYL BENZOYLPYRUVATE (III)

A mixture of 120 g. acetophenone and 146 g. of ethyl oxalate is added to the ethylate obtained from 25 g. of sodium and 300 g. of alcohol. The mixture sets in a solid mass. A further 500 cc. of alcohol are added and the mixture is acidified with 20% $SO_4H_2$. The sodium sulphate is separated by filtration and extraction is effected with benzene. 177 g. of product, having a boiling point of 167° C./5 mm. and a melting point of 40° C., are obtained.

3-CYANO-4-CARBETHOXY-6-PHENYL-2-PYRIDONE (IV)

155 g. of ethyl benzoylpyruvate are treated with 60 g. of cyanacetamide and 23 cc. of piperidine in 1200 cc. of absolute alcohol at 60° C. 100 g. of pyridone, having a melting point of 237° C., are obtained.

2-PYRIDONE-6-PHENYL-4-CARBOXYLIC ACID (V)

100 g. of the pyridone just obtained are refluxed with 750 cc. of concentrated ClH. By diluting the filtrate, 22 g. of product, having a melting point of 342° C., are obtained.

ETHYL 2-CHLORO-6 PHENYL-ISONICOTINATE (VI)

60 g. of the acid just obtained are treated with 105 g. of POCl$_3$ and 145 g. of PCl$_5$, then, after elimination of the POCl$_3$, with 130 g. of absolute alcohol. After elimination of the insoluble part, the mixture is poured onto the ice and extracted with ether. The ether is distilled and the residue is recrystallized in alcohol. 26 g. of product, having a melting point of 88–89° C., are obtained.

ETHYL 2-PHENYL-ISONICOTINATE (VII)

The product just obtained is hydrogenated in absolute alcohol in the presence of potassium acetate and palladium black. 6.5 g. of product, having a melting point of 44° C., are obtained.

2-PHENYL-ISONICOTINAMIDE (VIII)

The 6.5 g. of the product just obtained are agitated for a long period with 6 g. of saturated ammonia. 2.1 g. of solid white product, having a melting point of 137° C., are obtained.

2-PHENYL-ISONICOTINONITRILE (IX)

The treatment of the 2.1 g. of the product just obtained with 2.5 g. of $P_2O_5$ gives 1 g. of nitrile having a melting point of 75° C.

2-PHENYL-ISONICOTINIC THIOAMIDE (I)

1 g. of the product just obtained is dissolved in 5 cc. of absolute alcohol with 0.3 g. of triethanolamine. $H_2S$ is passed through the solution first at ordinary temperature and then in ice. 0.6 g. of thioamide, having a melting point of 157° C., is obtained.

Although specific examples of the invention have been described, it is to be understood that the invention is not limited thereto, the scope of the invention being defined in the appended claims.

Having now described my invention what I claim as new and desire to secure by Letters Patent is:

1. As new compounds: α-substituted isonicotinic thioamides having the general formula

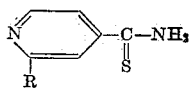

wherein R is selected from the group consisting of the alkyl radicals having from 1 to 6 inclusive carbon atoms, the phenyl and the benzyl radicals.

2. α-Ethyl-isonicotinic thioamide.
3. α-(n)-Propyl-isonicotinic thioamide.
4. α-Methyl-isonicotinic thioamide.
5. α-n-Butyl-isonicotinic thioamide.
6. α-Amyl-isonicotinic thioamide.
7. Process of preparing α-substituted isonicotinic thioamides having the general formula

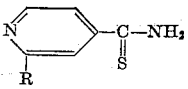

wherein R is selected from the group consisting of the alkyl radicals having from 1 to 6 inclusive carbon atoms, the phenyl and the benzyl radicals, comprising reacting hydrogen sulphide on the nitrile of the corresponding α-substituted isonicotinic acid in the presence of a nitrogenous tertiary base.

8. Process of preparing α-substituted isonicotinic thioamide having the general formula:

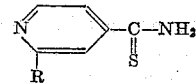

wherein R is selected from the group consisting of the alkyl radicals having from 1 to 6 inclusive carbon atoms, the phenyl and the benzyl radicals, comprising bubbling hydrogen sulphide in a solution of the nitrile of the corresponding α-substituted isonicotinic acid in an anhydrous solvent in the presence of a nitrogenous tertiary base.

9. Process of preparing α-substituted isonicotinic thioamides having the general formula:

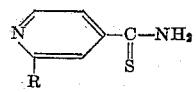

wherein R is selected from the group consisting of the alkyl radicals having from 1 to 6 inclusive carbon atoms, the phenyl and the benzyl radicals, comprising bubbling hydrogen sulphide in a solution of the nitrile of the corresponding α-substituted isonicotinic acid in ethanol in the presence of triethanolamine.

References Cited in the file of this patent

UNITED STATES PATENTS 2,653,942 Lee _____ Sept. 29, 1953

OTHER REFERENCES

Grumbach et al.: Compt. rend., vol. 242, pp. 2187-9 (1956).

Hollins: Synthesis of Nitrogen Ring Compounds, p. 221 (1924).